United States Patent [19]

Koch et al.

[11] 3,990,520
[45] Nov. 9, 1976

[54] TRACTOR WITH HYDRAULIC DRAFT CONTROL

[75] Inventors: James Allan Koch, Hudson; Richard Treichel, Cedar Falls; Benjamin Michael Witte, Waterloo, all of Iowa

[73] Assignee: Deere & Company, Moline, Ill.

[22] Filed: Aug. 4, 1975

[21] Appl. No.: 601,660

[52] U.S. Cl. .............................. 172/7; 91/189 R; 91/402; 91/410; 172/9
[51] Int. Cl.² ..................................... A01B 63/112
[58] Field of Search ..................... 172/7, 8, 9, 10; 91/189, 402, 410; 214/766; 280/446 R, 446 A

[56] References Cited
UNITED STATES PATENTS

| | | | |
|---|---|---|---|
| 2,750,862 | 6/1956 | Garmager | 172/7 |
| 2,940,530 | 6/1960 | Du Shane | 172/7 |
| 3,246,700 | 4/1966 | Smelcer | 172/7 |
| 3,470,963 | 10/1969 | Schneider et al. | 172/7 |
| 3,731,744 | 5/1973 | Lipinski | 172/7 |
| 3,834,738 | 9/1974 | Koch | 172/7 X |
| 3,894,476 | 7/1975 | Cobb | 91/410 X |

*Primary Examiner*—Richard T. Stouffer

[57] ABSTRACT

The lower draft link of a tractor three-point hitch includes a sensor to sense draft loads imposed on the draft link by an earth-working implement. Variations in the draft load cause variations in the pressure of the fluid in the sensor from a preselected pressure. A pilot-operated, load control valve is connected to the sensor and is shiftable in response to pressure above and below the preselected pressure to actuate a control mechanism. The control mechanism actuates a direction control valve for directing fluid to and from a hydraulic lift cylinder for respectively raising and lowering the draft link to adjust the implement so as to maintain the preselected pressure and thus maintain the desired draft load.

10 Claims, 2 Drawing Figures

TRACTOR WITH HYDRAULIC DRAFT CONTROL

BACKGROUND OF THE INVENTION

The present invention relates generally to a hitch system of the type which is responsive to draft loads to adjust the working depth of an implement connected thereto to maintain a preselected draft force and more particularly relates to draft control using a pilot-operated hydraulic valve which increases the sensitivity of the direction control mechanism to deviations in the draft load.

Prior art hitch systems have generally provided for draft sensing connected directly to the control mechanism as disclosed in the U.S. Pat. No. 3,731,745 granted to J. A. Koch on May 8, 1973 and the U.S. Pat. No. 2,940,530 granted to W. H. DuShane on June 14, 1960.

SUMMARY OF THE INVENTION

It is a general object of the present invention to provide hydraulic draft load control incorporating a pilot-operated valve for maintaining a desired draft load. The valve is highly sensitive to deviations in the draft load and corrects the position of the draft links accordingly. When the draft load increases, a draft sensor signals the pilot-operated valve which amplifies the signal to cause the draft links to be raised. Likewise, when the draft load decreases, the sensor signals the pilot-operated valve which amplifies the signal to cause the draft links to be lowered.

The above and additional objects and advantages of the present invention will become apparent to those skilled in the art from a consideration of the following detailed description when taken in conjunction with the accompanying drawings.

BRIEF DESCRIPTION OF THE PREFERRED EMBODIMENT

Figure 1:
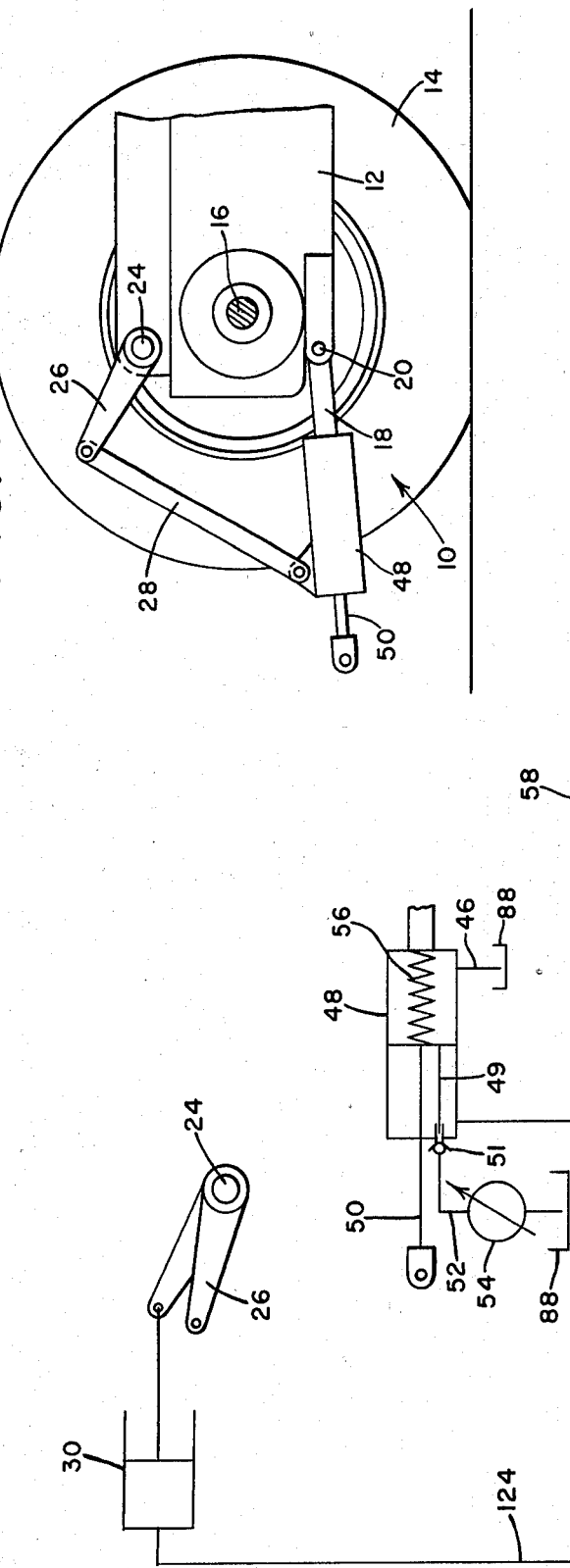
FIG. 1 is a section view of the rear portion of a tractor embodying a draft sensing hitch system used with the present invention.

Referring now to FIG. 1, there is shown the rear portion of a tractor 10 including a chassis 12 and wheels 14 (only one shown) on an axle 16. Attached to the chassis 12 for vertical movement about a pivotal connection 20 and extending rearwardly therefrom is a rearwardly extending draft link 18. The draft link 18 has integral therewith a sensor cylinder or sensor 48.

A horizontal transverse rockshaft 24 is journaled for rotation in the chassis 12 and a crank arm 26 is secured to and extends rearwardly from the rockshaft 24. Interconnecting the crank arm 26 and draft link 18 is a lift link 28. An extendable and retractable hydraulic lift cylinder 30 (shown in FIG. 2) is located in the chassis 12 and is connected to the rockshaft 24 for rocking the latter to cause the draft link 18 to be moved between a variable lowered working position and a raised transport position.

The sensor 48 includes a rod and piston assembly 50. The piston has a shaft 49 secured to it for selectively activating a ball check valve 51 which is connected by a supply line 52 to a fluid pump 54. The shaft 49 and the valve 51 cooperate to compensate for fluid leakage around the piston which is drained through a loss line 46 to a reservoir 88 and also to compensate for fluid venting through bleed line 44 and restrictor 42 to the reservoir 88. Compressed between the head end of the rod and piston assembly 50 and the cylinder head end is a helical compression spring 56 which urges the piston and rod assembly 50 toward an extended position. The rod end chamber of the sensor 48 is connected by a sensor line 58 to a pilot-operated load control valve 60.

The pilot-operated valve 60 includes a valve housing 62 having an interior cavity containing a valve body 64 which divides the cavity into a sensor connected chamber 86 and a supply chamber 65. The sensor connected chamber 86 is connected to the sensor line 58 and the supply chamber 65 is connected by a supply line 82 with the fluid pump 54.

The valve body 64 has a longitudinally extending bore with a main piston 68 slidably positioned therein and forming in cooperation therewith a main chamber 70. A retaining ring 71 limits the amount of inward sliding of the main piston 68 into the valve body 64 and an internal retaining ring 72 limits the amount of outward sliding.

A pilot piston 74 having balancing grooves 75 of known configuration is slidably mounted in the valve body 64 between the main chamber 70 and the sensor connected chamber 86. The pilot piston 74 extends through the main chamber 70 into slidable engagement with a longitudinal hole 77 in the main piston 68. A portion of the pilot piston 74 disposed in the hole 77 is of substantially the same diameter as the hole 77 for slidable movement therein while another portion is of reduced diameter so as to form a fluid passage 80 between a further reduced portion defining a subchamber 78 and the main chamber 70. The subchamber 78 is selectively connected by a port 76 with the fluid pump 54. The end portion of the pilot piston 74 which protrudes into the sensor connected chamber 86 is threaded into an adjusting nut and washer assembly 87 which compensates for various manufacturing and assembly tolerances. The assembly 87 is biased away from the valve body 64 by a valve spring 140 which is a constant rate spring for making the load control valve 60 equally sensitive for large or small draft loads such that a given change in draft load at light loads will cause substantially the same implement movement as at heavy loads.

In order to afford bi-directional movement of the main piston 68 as will hereinafter be described, the pilot piston 74 and the main piston 68 contain a longitudinally extending vent 90 which connects the main chamber 70 to the reservoir 88.

A control mechanism, as is commonly known in the art and of the general type shown in the U.S. Pat. No. 2,940,530 granted to W. H. Du Shane, is illustrated at 110. The mechanism 110 includes a load control member 112 abutting the main piston 68 at one end and pivotally connected by a pin 113 at the other end to one end of a pivot arm 132. The pivot arm 132 is medially and pivotally connected by a pin 114 to a control lever 126 which controls the draft control system. The control lever 126 is pivoted about a control lever pivot 128. A pin 130 connects the pivot arm 132 with a valve link 118. The valve link 118 is connected to operate a three-position, three-way, direction control valve 122.

The direction control valve 122 has a first port in the first side thereof to which the fluid pump 54 is connected and a second port in the first side thereof to which the reservoir 88 is connected. The port in the second side of the direction control valve 122 is connected by a lift cylinder line 124 with the lift cylinder 30 for adjusting the position of the draft link 18. A positioning spring 123 biases the direction control valve 122 to connect the lift cylinder line 124 with the reservoir 88.

With an earth-working implement (not shown) connected to the sensor 48 and being pulled through the soil by the tractor 10, the operator moves the draft control lever 126 to a position representative of the new desired draft load. This positioning places the control mechanism 110 and the load control valve 60 in positions unique to the new desired draft load.

The actual draft load plus the load of the compression spring 56 acting on the rod and piston assembly 50 provide a fluid pressure in the sensor connected chamber 86 of the load control valve 60 proportional to the actual draft load. The spring 56 further provides a fluid preload which allows for sensing negative draft loads. The fluid pressure in the sensor connected chamber 86 provides a position of the pilot piston 74 where the port 76 is in restricted fluid communication with the subchamber 78. The restricted fluid communication allows merely enough fluid from the pump 54 to reach the main chamber 70 as required to make up the loss of fluid through the vent 90.

Figure 2:
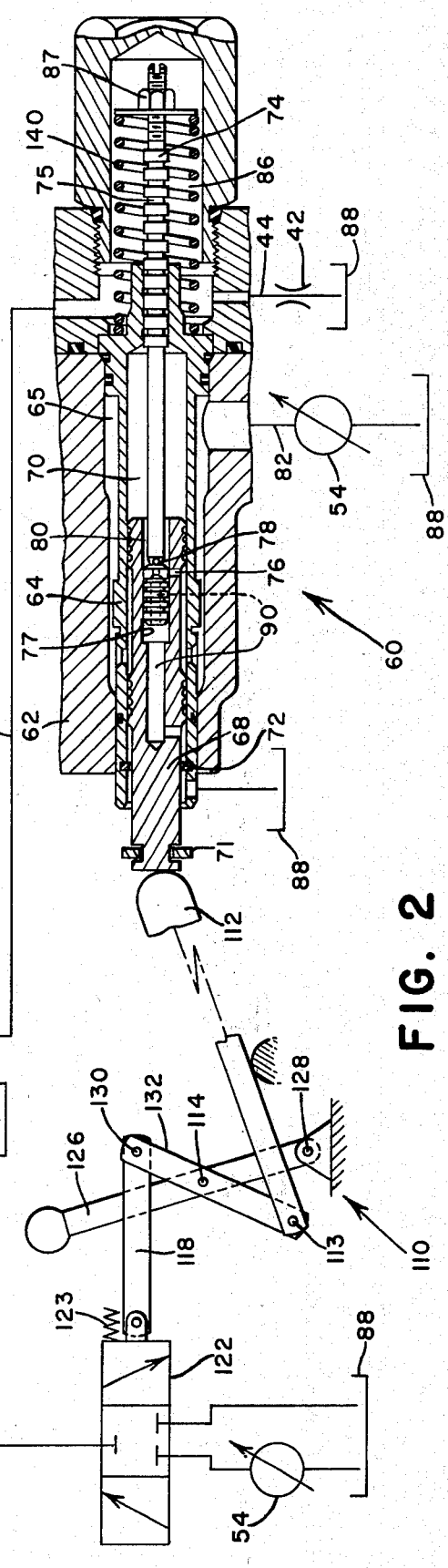
FIG. 2 is a schematic of the draft load control of the present invention.

When the actual draft load exceeds the desired draft load, referring now to FIG. 2, the pressure in the sensor 48 increases and forces the pilot piston 74 in the load control valve 60 slidingly to the left until the subchamber 78 is in full fluid communication with the port 76. With full fluid communication, pressurized fluid from the fluid pump 54 passes through the fluid passage 80 into the main chamber 70 causing the main piston 68 to move slidingly to the left.

The main piston 68 actuates the load control member 112 to cause the pivot arm 132 to pivot about the pin 114 in a clockwise direction. This clockwise movement causes the direction control valve 122 to fluidly connect the fluid pump 54 with the lift cylinder 30 causing the rockshaft 24 to rotate clockwise. The rotation raises the implement and decreases the draft, thus decreasing the draft load until the desired draft load is sensed by the sensor 48.

With the reduction of pressure in the sensor connected chamber 86, the valve spring 140 slides the pilot piston out of full fluid communication with the port 76. As fluid in the main chamber 70 is lost through the first vent 90, the main piston 68 is urged to the right by the positioning spring 123 on the direction control valve 122 acting through the control mechanism 110 linkages.

At the desired draft load, the restricted fluid communication between the subchamber 78 and the port 76 is reestablished as determined by the position of the draft control lever 126, and the direction control valve 122 assumes the ports blocked position.

When the draft load decreases below the desired draft load, the draft load control operates substantially in the reverse manner as described for draft load increases. The pressure in the sensor 48 decreases and causes the restricted fluid communication to cease. As the fluid is lost through vent 90, the main piston 68 moves to reestablish restricted fluid communication and causes the direction control valve 122 to connect the lift cylinder 30 to the reservoir 88. The rockshaft 24 rotates counterclockwise and the implement is lowered to increase draft until the desired draft load is reached. At the desired draft load, the pressure from the sensor 48 permits the restricted fluid communication to be reestablished and the direction control valve 122 to be returned to the ports blocked position.

As the actual draft load drops to zero, the fluid preload due to the compression spring 56 prevents the fluid pressure in the sensor connected chamber 86 from dropping to zero. The compression spring 56 maintains sufficient fluid pressure to allow normal sensing of negative draft loads as would occur when the implement drops into a depression in the ground and pushes against the sensor 48.

To decrease the draft load, the draft control level 126 is moved clockwise to a new position which in turn positions the direction control valve 122 to fluidly connect the fluid pump 54 to the lift cylinder 30. As the draft decreases, decreased pressure on the sensor 48 causes the restricted fluid communication in the load control valve 60 to cease. Movement of the main piston 68 to the right to reestablish restricted fluid communication allows the member 112, the arm 132, and the link 118 to move under urging by the positioning spring 123 to a new unique configuration so as to reposition the direction control valve 122 into its ports blocked position. To increase the draft load, the draft control lever 126 is moved counterclockwise to a new position which in turn positions the direction control valve 122 to fluidly connect the lift cylinder 30 to the reservoir 88. As the draft increases, increased pressure in the sensor 48 causes full fluid communication in the load control valve 60. Movement of the main piston 68 to the left to reestablish restricted fluid communication forces the member 112, the arm 132, and the link 118 to move into a further unique configuration so as to reposition the direction control valve 122 into its ports blocked position.

While the invention has been described in conjunction with a specific embodiment, it is to be understood that many alternatives, modifications, and variations will be apparent to those skilled in the art in light of the aforegoing description. Accordingly, it is intended to embrace all such alternatives, modifications, and variations that fall within the spirit and scope of the appended claims.

We claim:

1. In a tractor having power adjusting means for effecting adjustment of an associated implement to increase or decrease draft load, a draft load control comprising: a source of pressurized fluid; draft sensor means responsive to draft load and providing a fluid pressure output proportional thereto; a valve body having first and second chambers provided therein; fluid passage means connecting the sensor means to the first chamber; source passage means connecting the source to the second chamber; pilot piston means positioned in the first chamber and responsive to the sensor means output to move in the first chamber; said pilot piston means extending into the second chamber and having a portion of reduced cross-section proximate the extending end portion; main piston means slidably received in the second chamber, having an axial hole open to the second chamber provided therein for movably receiving the end portion of the pilot piston means, further having port means provided therein operatively connecting the source passage means to the axial hole and operatively associated with the end and reduced cross-section portions of the pilot piston means to afford or block passage of pressurized fluid from the port means of the main piston means to the reduced cross-section portion of the pilot piston means in response to relative movement between the pilot piston means and the main piston means, and responsive to the fluid pressure in the second chamber to move in the second chamber; and control means operatively associated with the main piston means and responsive to the movement thereof to selectively activate the power adjusting means to effect adjustment of the associated implement.

2. The draft control as claimed in claim 1 wherein said control means includes biasing means operatively associated with the main piston means for opposing the affect of the pressurized fluid on the main piston means and said pilot piston means includes vent means fluidly connecting the second chamber to a fluid reservoir to afford relief of fluid pressure in the second chamber.

3. The draft control as claimed in claim 2 including further biasing means operatively associated with the pilot piston means for opposing the affect of the output on the pilot piston means.

4. The draft control as claimed in claim 3 wherein the further biasing means includes means for increasing or decreasing the further biasing means opposition to the affect of the output.

5. The draft control as claimed in claim 1 wherein the draft sensor means includes biasing means opposing a portion of the affect of the draft load on the draft sensor means.

6. In a tractor having power adjusting means for effecting the vertical raising or lowering of an associated implement to decrease or increase draft load, a draft control comprising: a source of pressurized fluid; draft sensor means responsive to draft load and providing a fluid pressure output proportional to the draft load; load control valve means having coaxial cavities provided therein; means connecting the sensor means to the first of the cavities; source passage means connecting the source to the second of the cavities; pilot piston means movably positioned in the first of the cavities and cooperating therewith to form a sensor chamber fluidly pressurized by the sensor means output to urge the pilot piston means to move in the first and second of the cavities; said pilot piston means including an end portion extending into the second of the cavities and having an undercut portion proximate the extending end portion; main piston means slidably received in the second of the cavities and cooperating therewith to form a main chamber; said main piston means having an axial hole open to the main chamber provided therein for slidably receiving the end portion of the pilot piston means and further having port means provided therein operatively connecting said source passage means to the axial hole and operatively associated with the end and undercut portions of the pilot piston means to fluidly connect and disconnect the source from the main chamber so as to afford and block pressurization of the main chamber whereby the main piston means is urged to slide in the second of the cavities; and control means operatively associated with the main piston means and responsive to the sliding thereof to selectively activate the power adjusting means to effect adjustment of the associated implement.

7. The draft control as claimed in claim 6 wherein said control means includes biasing means operatively associated with the pilot piston means for opposing the affect of the pressurized fluid on the main piston means and said pilot piston means includes vent means fluidly connecting the main servo chamber to a fluid reservoir to afford relief of fluid pressure in the main servo chamber.

8. The draft control as claimed in claim 7 including further biasing means operatively associated with the pilot piston means for opposing the affect of the fluid pressure on the pilot piston means.

9. The draft control as claimed in claim 8 wherein the further biasing means includes means attached to the pilot piston for increasing or decreasing the further biasing means opposition the affect of the fluid pressure on the pilot piston means.

10. The draft control as claimed in claim 6 wherein the draft sensor means includes internal biasing means opposing a portion of the affect of the draft load on the draft sensor means.

* * * * *